(12) United States Patent
Yamamoto

(10) Patent No.: US 8,201,778 B2
(45) Date of Patent: Jun. 19, 2012

(54) INSTALLING STRUCTURE OF WIRE HARNESS

(75) Inventor: Masataka Yamamoto, Kosai (JP)

(73) Assignee: Yazaki Corporation, Tokyo (JP)

( * ) Notice: Subject to any disclaimer, the term of this patent is extended or adjusted under 35 U.S.C. 154(b) by 62 days.

(21) Appl. No.: 11/838,276

(22) Filed: Aug. 14, 2007

(65) Prior Publication Data

US 2008/0035800 A1     Feb. 14, 2008

(30) Foreign Application Priority Data

Aug. 14, 2006  (JP) .................................. 2006-221006

(51) Int. Cl.
  *F16L 3/00* (2006.01)
(52) U.S. Cl. .......................................... 248/51; 174/525
(58) Field of Classification Search .................. 248/51, 248/70, 73, 63, 65, 68.1, 74.2; 296/155, 296/146.12; 59/78.1, 79.1
  See application file for complete search history.

(56) References Cited

U.S. PATENT DOCUMENTS

| | | | | | |
|---|---|---|---|---|---|
| 1,340,818 | A | * | 5/1920 | Brinkman | 285/222.5 |
| 1,435,311 | A | * | 11/1922 | Knight | 138/110 |
| 5,879,047 | A | * | 3/1999 | Yamaguchi et al. | 296/146.7 |
| 5,879,074 | A | * | 3/1999 | Pastrick | 362/494 |
| 6,305,556 | B1 | * | 10/2001 | Mayer | 211/26 |
| 6,374,589 | B1 | * | 4/2002 | Kunert et al. | 59/78.1 |
| 6,811,404 | B2 | * | 11/2004 | Doshita et al. | 439/34 |
| 7,053,304 | B2 | * | 5/2006 | Ojima et al. | 174/72 A |
| 7,278,253 | B2 | * | 10/2007 | Wehler et al. | 59/78.1 |
| 7,399,922 | B2 | * | 7/2008 | Oga et al. | 174/72 A |
| 7,429,716 | B2 | * | 9/2008 | Bong et al. | 219/125.1 |
| 7,435,311 | B1 | * | 10/2008 | Marzen et al. | 156/286 |
| 2002/0179318 | A1 | * | 12/2002 | Seo | 174/71 R |
| 2003/0184119 | A1 | * | 10/2003 | Doshita et al. | 296/155 |
| 2005/0189333 | A1 | * | 9/2005 | Nakagiri et al. | 219/125.1 |

FOREIGN PATENT DOCUMENTS

| | | |
|---|---|---|
| JP | 62-68788 U | 4/1987 |
| JP | 2-92180 U | 7/1990 |
| JP | 3-81685 U | 8/1991 |
| JP | 06-276643 A | 9/1994 |
| JP | 8-149654 A | 6/1996 |
| JP | 10-175483 A | 6/1998 |
| JP | 11-037349 A | 2/1999 |
| JP | 2000-108674 A | 4/2000 |
| JP | 2003-252061 A | 9/2003 |
| JP | 2006-20420 A | 1/2006 |

OTHER PUBLICATIONS

Notification of Reason for Refusal issued Jun. 1, 2010 in counterpart Japanese Application No. 2006-221006.
Japanese Office Action issued on Dec. 7, 2010 in the corresponding Japanese Patent Application No. 2006-221006.

* cited by examiner

*Primary Examiner* — Amy Sterling
*Assistant Examiner* — Erin W Smith
(74) *Attorney, Agent, or Firm* — Sughrue Mion, PLLC

(57) ABSTRACT

An installing structure of a wire harness on a link includes a link which pivotally connects a movable structural body to a fixed structural body, a wire harness which is installed along the link so as to extend from the fixed structural body to the movable structural body, a singular first flexible protective tube through which the wire harness is slidably passed, and a fixing member which fixes the flexible protective tube to the link.

14 Claims, 10 Drawing Sheets

INSTALLING STRUCTURE OF WIRE HARNESS

BACKGROUND OF THE INVENTION

This invention relates to an installing structure of a wire harness on a link, in which the wire harness is installed along the link for opening and closing an automotive roof or the like.

FIGS. 10 and 11 show one form of automotive roof storage structure employing a conventional link mechanism (see Patent Literature 1).

This roof storage structure includes a pair of front and rear pivotal links 52 and 53 pivotally connected to a vehicle body 51, an intermediate upper fixing link 55 connected to the front pivotal link 52, a front upper fixing link 54 connected to the rear pivotal link 53, a soft-top roof 56 fixed to the front upper fixing link 54.

In a completely-closed condition (not shown) of the roof 56, the front upper fixing link 54 and the intermediate upper fixing link 55 are arranged on a horizontal straight line, and the pair of front and rear pivotal links 52 and 53 are positioned generally upright. The pivotal links 52 and 53 are pivotally moved rearwardly from this condition (FIG. 11 shows a half-open condition of the roof), so that the fixing links 54 and 55 are superposed in a vertically-stepped manner, and in a stored condition (the open condition of FIG. 11) of the roof 56, the pivotal links 52 and 53 are positioned generally horizontally, and the fixing links 54 and 55 are disposed on the upper side of the pivotal links 52 and 53 in a folded manner.

Although a drive unit for the above link mechanism is not described, a structure (not shown) in which a link is driven by a motor and a pinion is described, for example, in Patent Literature 2.

Also, a structure for opening and closing not an automotive roof but an automotive door by a link mechanism is described, for example, in Patent Literature 3. In this structure (not shown), the door is swingably connected to a vehicle body by a flexible link arm, and a pair of front and rear horizontal parallel links are provided between the door and the vehicle body.

A wire harness is installed on and fixed to one link, and one side portion of the wire harness is installed along a flexible caterpillar-like exterior member on the door, while the other side portion of the wire harness is installed on the vehicle body (power source-side). Electric power is always or continuously supplied to auxiliary equipments on the door via the wire harness.

There is a fear that rainwater and the like get on the wire harness when the door is opened, and Patent Literature 4 discloses a structure (not shown) in which water intruding between wires of the wire harness is discharged to the exterior via a plurality of holes formed in a lower end of a waterproof resin tube provided on the outer periphery of the wire harness.

[Patent Literature 1] JP-A-2000-108674 (FIGS. 1 to 5)
[Patent Literature 2] JP-A-2003-252061 (FIG. 1)
[Patent Literature 3] JP-A-10-175483 (FIGS. 5 and 9)
[Patent Literature 4] JP-A-6-276643 (FIG. 2)

In the roof storage structures of the above Patent Literatures 1 and 2, a harness installation structure for the purpose of continuously supplying electric power to the roof is not described. However, generally, an auxiliary equipment such as a room lamp is mounted on a vehicle roof, and it is necessary to continuously supply electric power to the auxiliary equipment on the stowable (convertible) roof, and the harness installation structure for this purpose has been indispensable.

However, in the case where a wire harness is installed on a link, tension and a bending force act on the wire harness installed along the link in accordance with a pivotal movement of the link at the time of opening and closing the roof, and looseness (surplus length) develops in the wire harness. Therefore, it has been desired to smoothly absorb such a surplus length easily and positively at low costs. It has also been necessary to take measures to deal with the situation in which rainwater or the like intrudes into the wire harness installed along the link when the roof is opened and closed.

For example, in case the wire harness installed along the link is fixed to the link by clips, a pulling force and a bending force directly act on the wire harness, so that the durability of the wire harness is extremely lowered. However, if the wire harness is softly supported at a plurality of bent portions thereof, the cost of support members is high, and also much time and labor are required for the assembling operation, and furthermore there are fears that the wire harness may become loose between the support members and that damage and a shortened lifetime resulting from this looseness may be encountered. Furthermore, when rainwater or the like intruding into the wire harness is left as it is, there are fears that incomplete contact of a connector and a malfunction of the auxiliary equipment resulting therefrom may be encountered.

These problems are not limited to the roof, but can be encountered also with other structures in which a door or other movable structural body is connected to a fixed structural body such as a vehicle body by links.

SUMMARY OF THE INVENTION

With the foregoing in view, it is an object of this invention to provide a structure of installing a wire harness on a link, in which a movable structural body is connected to a fixed structural body by the link, and the wire harness is installed along the link, and a surplus length of the wire harness extending along the link can be easily, smoothly and positively absorbed at a low cost, and besides the intrusion of water along the wire harness can be easily dealt with, thereby enhancing the reliability of continuous supply of electric power.

The above object has been achieved by an installing structure of a wire harness on a link, the installing structure, comprising:

a link which pivotally connects a movable structural body to a fixed structural body;

a singular first flexible protective tube through which the wire harness is slidably passed; and a fixing member which fixes the first flexible protective tube to the link, wherein the wire harness is installed along the link so as to extend from the fixed structural body to the movable structural body.

With this construction, the movable structural body is opened and closed relative to the fixed structural body by pivotal movement (in normal and reverse directions) of the link, and in accordance with the pivotal movement of the link, the wire harness smoothly slides within the first protective tube on the link, so that a surplus length portion (bent portion) of the wire harness at one end of the first protective tube moves toward the other end of the first protective tube. As a result, a surplus length of the wire harness is smoothly absorbed. The wire harness is passed through the single continuous first protective tube, and therefore for example, as compared with the case where a plurality of separate protective tubes are used, the wire harness is prevented from becoming loose between such separate protective tubes. As the protective tube, an existing general-purpose part, such as a bellows-like corrugated tube made of a synthetic resin and an oily tube of a flattened tubular shape can be suitably used. As the fixing member, a clamp, a band or the like can be suitably used. The wire harness includes at least a plurality of wires.

Preferably, at least two of the fixing members are provided on the link. Opposite end portions of the first flexible protective tube project from the fixing members.

With this construction, when the wire harness is bent at the opposite ends of the first protective tube in accordance with the pivotal movement of the link, the wire harness is smoothly bent, together with each end portion of the first protective tube, with a large bending radius, so that the folding, etc., of the wire harness is prevented.

Preferably, a part of the wire harness derived from the first flexible protective tube is passed through a second flexible protective tube disposed at the movable structural body.

With this construction, when the part of the wire harness extending from the end of the first protective tube toward the movable structural body is bent in accordance with the pivotal movement of the link, the second protective tube on the movable structural body, together with the wire harness portion, is smoothly bent with a large bending radius, thereby preventing the folding, etc., of the wire harness. Preferably, the second protective tube on the movable structural body is made of the same material and has the same shape as the first protective tube on the link. The second protective tube on the movable structural body can be suitably set to a necessary length.

Preferably, the first flexible protective tube has a bent portion formed at an intermediate part of the first flexible protective tube in a longitudinal direction thereof. The wire harness is bent along a bending inner-side surface of the bent portion with a bending radius larger than that of the bent portion.

With this construction, the radius of bending of the wire harness extending along the link is set to a value larger than the radius of bending of the protective tube, and the ability of the wire harness to slide within the protective tube, as well as its lifetime, are enhanced. Merely by setting the bending radius of the protective tube, the bending radius of the wire harness within the protective tube can be automatically determined. The fact that the bending radius of the wire harness is larger than the bending radius of the first protective tube is attributable to the fact that the protective tube is higher in bendability (that is, can be more easily bent) than the wire harness. The configuration of bending of the wire harness along the link is mostly determined by the shape of the link, etc.

Preferably, the two bent portions which are bended in opposite directions to each other are formed at the intermediate part of the first flexible protective tube. Drain holes are formed respectively in bending outer-side surfaces of the two bent portions.

With this construction, at the time of stopping of the link (in the open condition or the closed condition) and on other occasions, water drops within the corrugated tube and dirt and the like deposited on the wire harness are discharged to the exterior via the drain holes, and the water drops, dirt, etc., are prevented from intruding into a connector, etc., to which the wire harness is connected. At each of the two bent portions of the corrugated tube, the wire harness is contacted with that side of the inner surface of the protective tube facing away from the drain hole, and therefore the drain hole is always kept open, so that good drainability is maintained. And besides, the two bent portions are connected together by an abruptly-slanting portion, and therefore water drops, etc., vigorously drop along the slanting portion toward the drain hole.

Preferably, the first flexible protective tube is a corrugated tube made of a synthetic resin.

With this construction, the cost of the parts is reduced by the use of the corrugated tube which is an existing general-purpose part. The corrugated tube has peripheral groove portions and ridge portions alternately arranged in a direction of a length of the tube, and an inner surface of the tube is also similarly corrugated, and therefore the wire harness smoothly slides on ridge portions on the inner surface of the tube with a low friction.

In the above configurations, the wire harness extending along the link is slidably passed through the single flexible protective tube, and therefore for example, as compared with the case where a plurality of separate protective tubes are used, the wire harness is prevented from becoming loose between such separate protective tubes, and also damage resulting from such looseness is prevented. A harness surplus length is easily and positively absorbed, and the reliability of continuous supply of electric power to the movable structural body is enhanced. And besides, the existing general-purpose part is used as the flexible protective tube, and therefore the cost of the parts is reduced.

In the above configurations, the wire harness is smoothly bent, together with each end portion of the protective tube, with a large radius, and therefore the folding of the wire harness and the concentration of stresses thereon are prevented, and the lifetime of the wire harness is prolonged, and the reliability of continuous supply of electric power is enhanced.

In the above configurations, the protective tube on the movable structural body, together with the wire harness portion, is smoothly bent with a large radius, and therefore the folding of the wire harness and the concentration of stresses thereon are prevented, and the lifetime of the wire harness is prolonged, and the reliability of continuous supply of electric power is enhanced.

In the above configurations, the radius of bending of the wire harness is larger than the radius of bending of the protective tube, and therefore the ability of the wire harness to slide within the protective tube is enhanced, and the catching, etc., of the wire harness are prevented, and the harness surplus length portion is smoothly moved (absorbed), and the reliability of continuous supply of electric power is enhanced.

In the above configurations, the drain holes are not closed by the wire harness, and therefore water drops, dirt, etc., within the protective tube are positively discharged via the drain holes, and the water drops, dirt, etc., are prevented from intruding into a connector, etc., to which the wire harness is connected, and the reliability of continuous supply of electric power is enhanced.

In the above configurations, the cost of the parts is reduced by the use of the corrugated tube which is an existing general-purpose part. And besides, the wire harness slides on the corrugated inner surface of the corrugated tube with a low friction, so that the ability to absorb the harness surplus length is enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

FIGS. 1 to 4 show one preferred embodiment of an installation structure (of installing a wire harness on a link) of the present invention. The link of this embodiment is so designed as to store a roof (not shown) of an automobile in a folded manner in a luggage space (not shown) at a rear portion of the vehicle.

Figure 1:
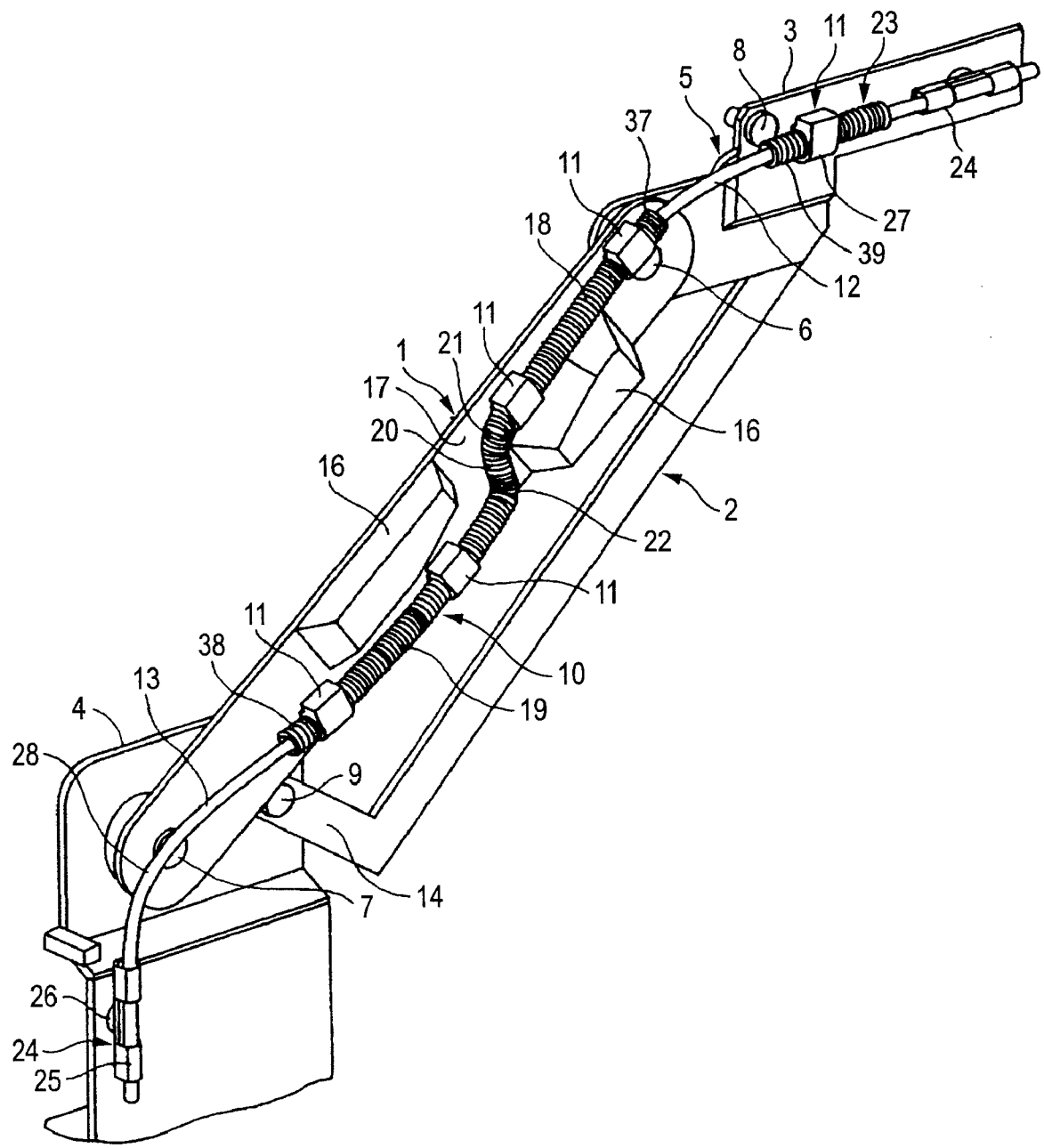
FIG. 1 is a perspective view of one preferred embodiment of an installation structure of (installing a wire harness on a link) of the present invention, showing an initial position of the link.
Figure 2:
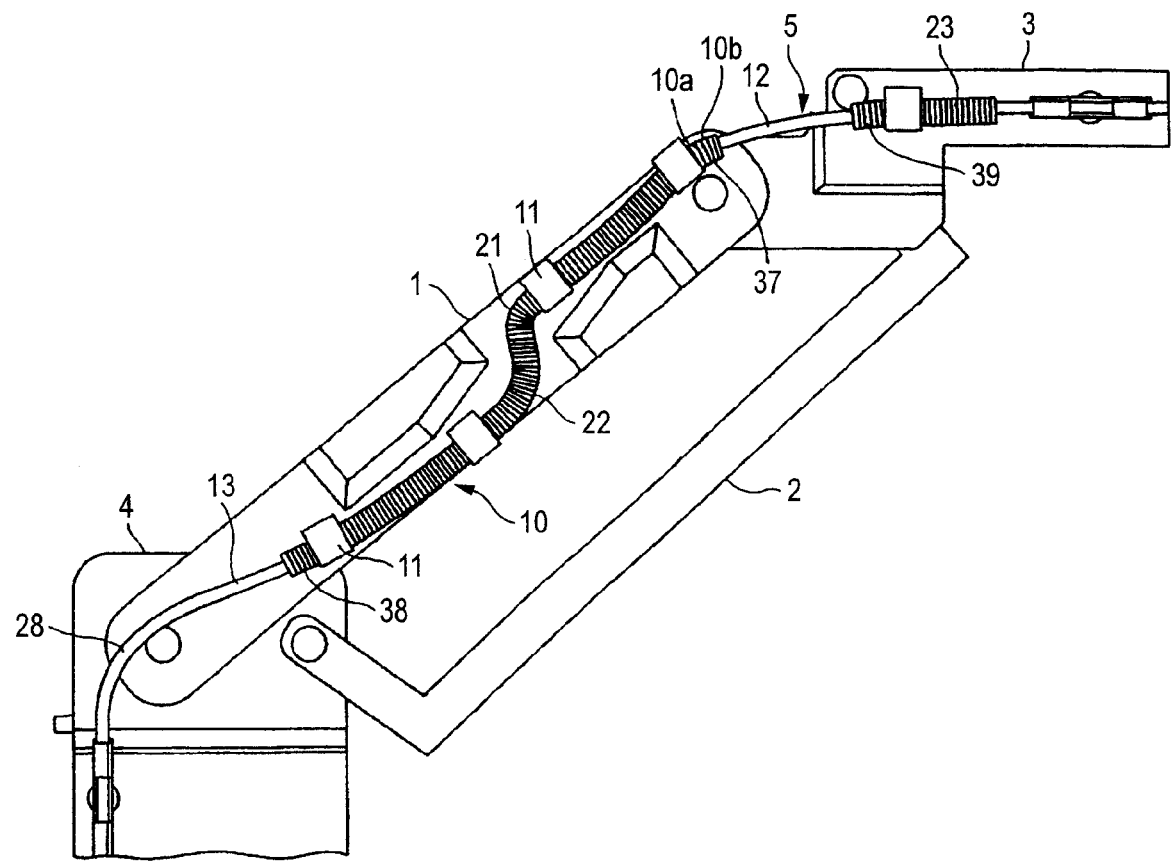
FIG. 2 is a front-elevational view of the wire harness installation structure, showing the initial position of the link.
Figure 3:
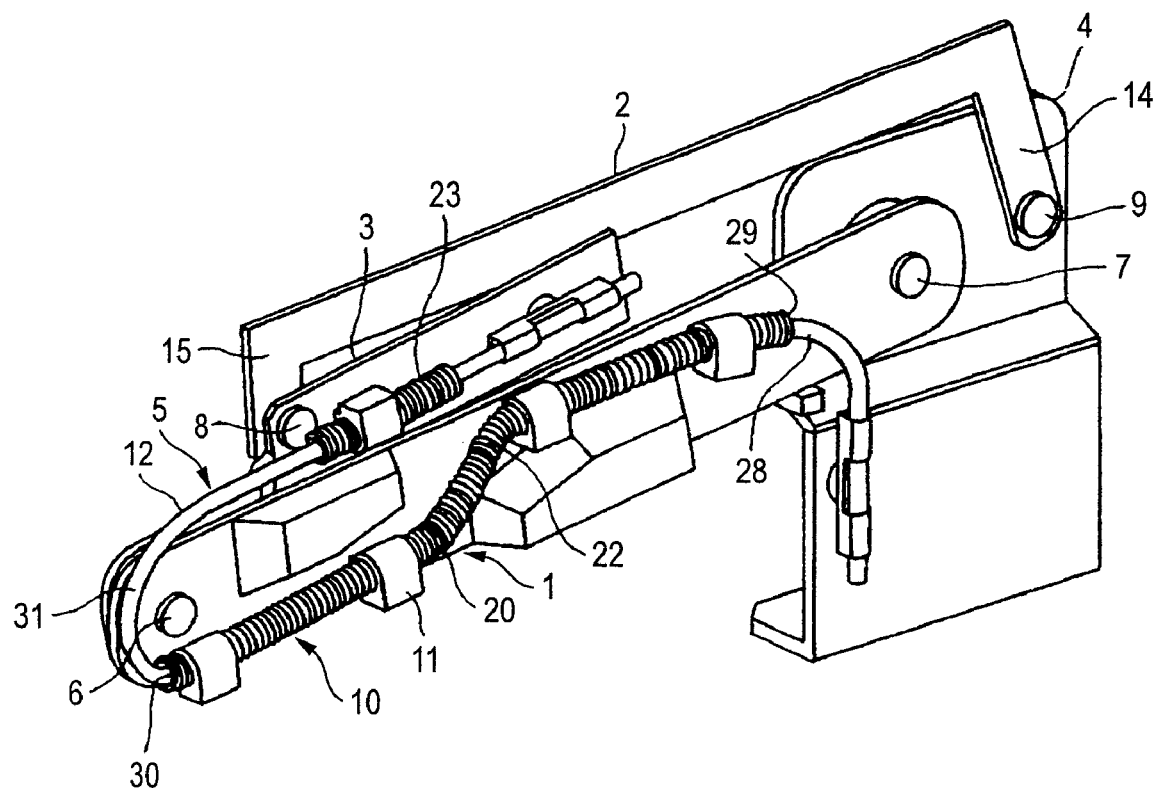
FIG. 3 is a perspective view of the wire harness installation structure, showing a pivotally-moved position of the link.
Figure 4:
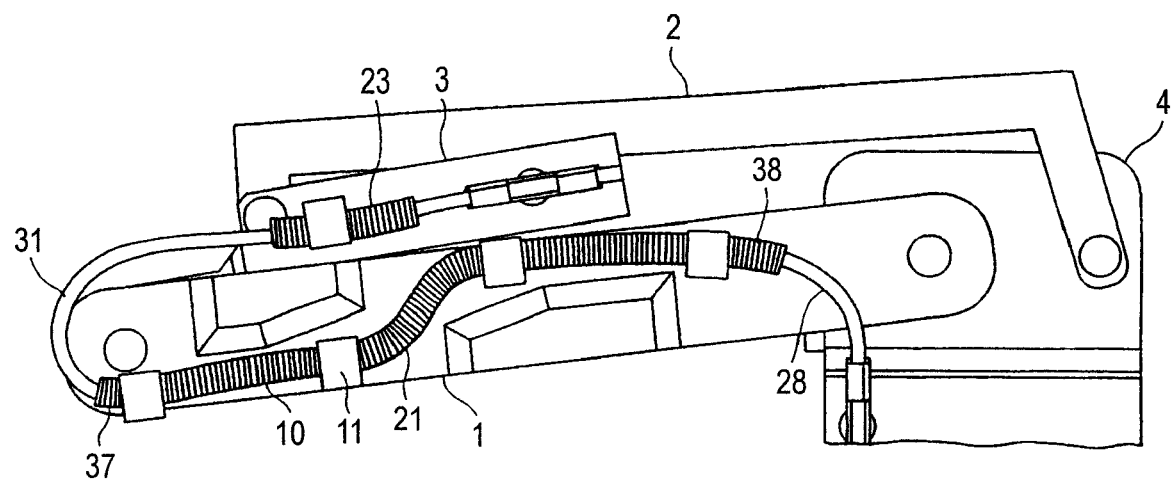
FIG. 4 is a front-elevational view of the wire harness installation structure, showing the pivotally-moved position of the link.

FIGS. 1 and 2 show a closed condition of the roof in which two (upper and lower) links 1 and 2 are pivotally moved forwardly toward the front of the vehicle to be disposed upwardly obliquely, and FIGS. 3 and 4 show an open condition of the roof (the condition in which the roof is stored or stowed in the luggage space) in which the links 1 and 2 are pivotally moved rearwardly toward the rear of the vehicle to be disposed in a slightly downwardly-slanting position relative to a horizontal direction.

As shown in FIGS. 1 and 2, the wire harness (comprising a plurality of insulating sheathed wires) 5 is installed on the main link (pivotal link) 1 of a larger width which is positioned at the upper side when the roof is closed. An upper end of the main link 1 is pivotally connected to a generally-horizontal fixing link (roof-side link) 3 by a shaft portion 6, and a lower end of the main link 1 is pivotally connected to a vehicle body-side link bracket 4 by a shaft portion 7.

The wire harness extending along the main link 1 is passed through a bore of one long corrugated tube (protective tube) 10 made of a synthetic resin, and the corrugated tube 10 is fixed to the main link 1 by clamps 11 provided respectively at a plurality of portions of the tube 10. That portion 12 of the wire harness 5 led out of an upper end of the corrugated tube 10 extends along the fixing link 3, and then is installed on the roof. That portion 13 of the wire harness 5 led out of a lower end of the corrugated tube 10 extends in a downwardly-bent manner along the vehicle body-side link bracket 4, and then is installed on the vehicle body (power source-side).

The auxiliary link (pivotal link) 2 of a smaller width is disposed at the lower side of the main link 1 in a generally parallel relation thereto. A lower end portion (one end portion) 14 of the auxiliary link 2 is bent into a hook-shape, and is pivotally connected by a shaft portion 9 to the link bracket 4 at a position disposed forwardly of the shaft portion 7 of the main link 1. An upper end portion (the other end portion) 15 (FIGS. 3 and 4) of the auxiliary link 2 is also similarly bent, and is pivotally connected by a shaft portion 8 to the roof-side fixing link 3 at a position disposed forwardly of the shaft portion 6 of the main link 1. The "fixing" link 3 means that this link is fixed to the roof (the movable structure).

The main link 1 has projected (bulged) portions 16 (projecting in a direction of its thickness) formed respectively at its front half portion and intermediate portion, and the wire harness 5, together with the corrugated tube 10, is installed on a flat surface 17 of the main link 1 in such a manner that the wire harness 5 and the corrugated tube 10 are bent into a generally crank-shape to avoid the projected portions 16. The strength of the main link 1 is increased thanks to the formation of the projected portions 16. The projected portions 16 can serve as stoppers for stopping the pivotally-moving main link 1 at a start end and a finish end of the pivotal movement (in normal and reverse directions) of the main link 1

The corrugated tube 10 is installed along an upper-side portion of the front half portion of the main link 1, and is also installed along a lower-side portion of a rear half portion of the main link 1, and the corrugated tube 10 is bent between an upper-side (one-side) installed portion 18 thereof and a lower-side (the other-side) installed portion 19 thereof to provide a downwardly (generally vertically) extending portion (Two bent portions are designated respectively by reference numerals 21 and 22, and the downwardly-extending portion between the two bent portions is designated by reference numeral 20.).

The upper-side installed portion 18 is fixed to the main link 1 by the clamps 11 at its two portions, that is, its front and rear end portions, and the lower-side installed portion 19 is fixed to the main link 1 by the clamps 11 at its two portions, that is, its front and rear end portions.

A front (upper) end portion 37 of the corrugated tube 10 slightly projects forwardly from the front-side (upper-side) clamp 11, and is in a free condition (that is, flexible). Similar, a rear (lower) end portion 38 of the corrugated tube 10 slightly projects from the rear-side (lower-side) clamp 11, and is in a free condition (that is, flexible).

The corrugated tube 10 is provided on the main link 1 such that it extends from the vicinity of the upper end of the main link 1 through a gap between the two projected portions 16 to a point disposed forwardly of and generally adjacent to the lower end of the main link 1. The wire harness portion 12 led out of the upper end of the corrugated tube 10 is extended generally straight (to be precise, with an extremely large radius of curvature) to the fixing link 3.

As shown in FIG. 2, the upper end portion 37 of the corrugated tube 10, together with the wire harness portion 12, is bent slightly downwardly, and causes the wire harness portion 12 to be smoothly bent with a large radius, thereby preventing the folding, etc., of the wire harness portion 12.

A horizontal short corrugated tube 23 is fixed to the fixing link 3 by a clamp 11, and the wire harness 5 passes through the short corrugated tube 23, and is fixed to the fixing link 3 by a front-side fixing member 24.

The short corrugated tube 23 is fixed by the camp 11 to the fixing link 3 at its longitudinally-intermediate portion thereof, and a rear end portion 39 of the short corrugated tube 23 is in a free condition (that is, flexible). The rear end portion 39, together with the wire harness portion 12, is smoothly bent with a large radius, thereby preventing the folding, etc., of the wire harness portion 12.

The wire harness portion 13 let out of the lower end of the corrugated tube 10 is bent downwardly with a large radius while extending along the flat surface 17 of the main link 1 and passing slightly above the shaft portion 7, and is fixed by a fixing member 24 to the link bracket 4 to be directed downwardly (vertically).

As shown in FIG. 2, the lower end portion 38 of the corrugated tube 10, together with the wire harness portion 13, is bent slightly upwardly, and causes the wire harness portion 13 to be smoothly bent with a large radius, thereby preventing the folding, etc., of the wire harness portion 13.

Each of the fixing members 24 is of the known type, and is made of metal, and the fixing member 24 includes a pair of front and rear wire clamping portions 25 of a cylindrical shape, and an intermediate screw fastening portion (externally-threaded portion) 26, and the screw fastening portion 26 extends through a hole in the fixing link 3 or the link bracket 4, and is fastened thereto by a nut threaded on the screw fastening portion 26. The fixing member 24 is not limited to this type, and any other suitable fixing member such as a band clip can be used.

The clamps (fixing members) 11 used to fix the corrugated tubes 10 and 23 to the links 1 and 3 are existing general-purpose parts made of a synthetic resin, and the clamp 11 includes a tube grip portion 27 of the split type or the opening-closing type, and a clip (not shown) for being retainingly inserted in a hole in the link 1, 3. A ridge (not shown) for engagement in a groove portion 10a of the corrugated tube 10, 23 is formed on an inner surface of the grip portion 27. The clip of an integral construction has a pair of elastic retaining claws formed respectively at distal ends of support leg portions thereof.

The corrugated tube 10 is an existing general-purpose part, and has groove (recess) portions 10a and ridge (convex) portions 10b alternately arranged in the direction of the length of the tube 10, and is formed into a bellows-like configuration so as to be bent. The corrugated tube 10 can be bent upon application of a bending force, but has a certain degree of rigidity since it is made of a synthetic resin.

There two types of corrugated tube 10, one having a longitudinal slit (not shown) while the other has no such slit. In the case of using the corrugated tube with the slit, the wire harness 5 can be easily inserted into the corrugated tube through the slit. In the case of using the corrugated tube 10 with no slit, the wire harness 5 is inserted into the corrugated tube 10 from one open end thereof toward the other open end thereof.

In order to prevent the wire harness 5 (comprising the plurality of wires) from being unbundled and also to enhance the bendability, it is preferred that the wire harness 5 be beforehand passed, for example, through a synthetic resin-made net-like tube (fiderial tube) of a small diameter which is more flexible than the corrugated tube 10. As another alternative, the plurality of wires can be bundled together by winding a vinyl tape or the like thereon. Generally, from the concept of a wire harness, the wire harness 5 is construed as including the corrugated tube 10. In the present invention, however, the wire harness 5 is defined as not including the corrugated tubes 10 and 23. Preferably, in the process of producing the wire harness, the corrugated tubes 10 and 23 and the clamps 11 are attached to the wire harness 5.

The main link 1, together with the auxiliary link 2, is electrically driven to be pivotally moved rearwardly from the roof-closed condition of FIGS. 1 and 2 by a drive unit (for example, comprising a motor and a pinion), and also the roof-side link 3, together with the roof, is generally translated to be positioned at the upper side of the main link 1 in a folded manner as shown in FIGS. 3 and 4. The auxiliary link 2 is positioned at the upper side of the fixing link 3. The thus pivotally-moved links 1 to 3 are stopped at respective positions such that these links are slanting slightly downwardly relative to the horizontal direction. The links 1 to 3 are offset from one another in the direction of their thickness.

In accordance with this pivotal movement of the links 1 to 3, the wire harness 5 slides within the corrugated tube 10, so that a surplus length of the wire harness 5 is absorbed. Namely, a bent portion 28 passing over the lower shaft portion 7 of the main link 1 (in FIGS. 1 and 2) is inserted into the corrugated tube 10 from the front open end 29 of the corrugated tube 10 as shown in FIGS. 3 and 4, and is bent rearwardly (in a reverse direction), and the wire harness 5 is led out of the rear open end 30 of the corrugated tube 10 by an amount corresponding to the amount of insertion of the bent portion 28 to form an arcuately-bent portion 31 directed toward the roof-side fixing link 3, and this bent portion 31 is smoothly turned back forwardly into a generally U-shape or J-shape between the open end 30 and the fixing link-side short corrugated tube 23.

Thus, in accordance with the pivotal movement of the links 1 and 2, the wire harness 5 smoothly slides along the inner surface of the corrugated tube 10 with a low friction, and the surplus length portion (designated by reference numeral 28 in FIG. 1) smoothly moves from one end of the corrugated tube 10 toward the other end thereof, so that the surplus length is positively absorbed promptly.

The fixing link-side short corrugated tube 23 flexibly (bendably) holds the wire harness portion 12 on the fixing link 3, thereby preventing the folding, rubbing, etc., of the wire harness portion 12 (In the case where the harness fixing member 24 is directly used without the use of the short corrugated tube 23, the wire harness portion 12 is liable to be folded at an end of the fixing member 24 and is liable to rub against this end.

When the link 1 is to be pivotally moved forwardly from the roof-stored (open) condition of FIGS. 3 and 4) so as to obtain the roof-closed condition of FIGS. 1 and 2, an operation reverse to the above operation is effected. Namely, in accordance with the pivotal movement of the link 1, the rear bent portion (surplus length portion) 31 of the wire harness (in FIGS. 3 and 4) smoothly slides (moves) within the corrugated tube 10, so that the rear bent portion (surplus portion) 28 of the wire harness 5 (in FIGS. 1 and 2) is provided.

Like the outer surface of the corrugated tube 10, the inner surface thereof is similarly corrugated (The ridge portions 10b on the outer surface correspond respectively to groove portions on the inner surface, while the groove portions 10a on the outer surface correspond respectively to ridge portions on the inner surface.). The wire harness 5 is contacted with the ridge portions on the inner surface with small contact areas, so that the sliding resistance is reduced.

If the corrugated tube 10 is not in a single continuous form, but is divided into a plurality of sections (division corrugated tubes) along the main link 1, and are mounted on the main link 1, the wire harness 5 is partially exposed between the adjacent division corrugated tubes (not shown), and the exposed portion becomes loose, and projects from a gap between the division corrugated tubes, and is caught, and as a result the durability is lowered, and an abnormal sound is generated. Therefore, the corrugated tube 10 mounted along the main link 1 is in the single and continuous form, preferably.

The corrugated tube 10 is the existing general-purpose part, and is inexpensive, and has a certain degree of rigidity. Therefore, the corrugated tube 10 will not be bent or deformed between the adjacent clamps 11 in accordance with the pivotal movement of the link 1, and will slide smoothly and rapidly along the inner surface of the corrugated tube 10, thereby positively absorbing the surplus length (that is, moving the surplus length portion). The surplus length portion is positively moved, so that a surplus length will not develop in the wire harness as a whole.

Figure 5:
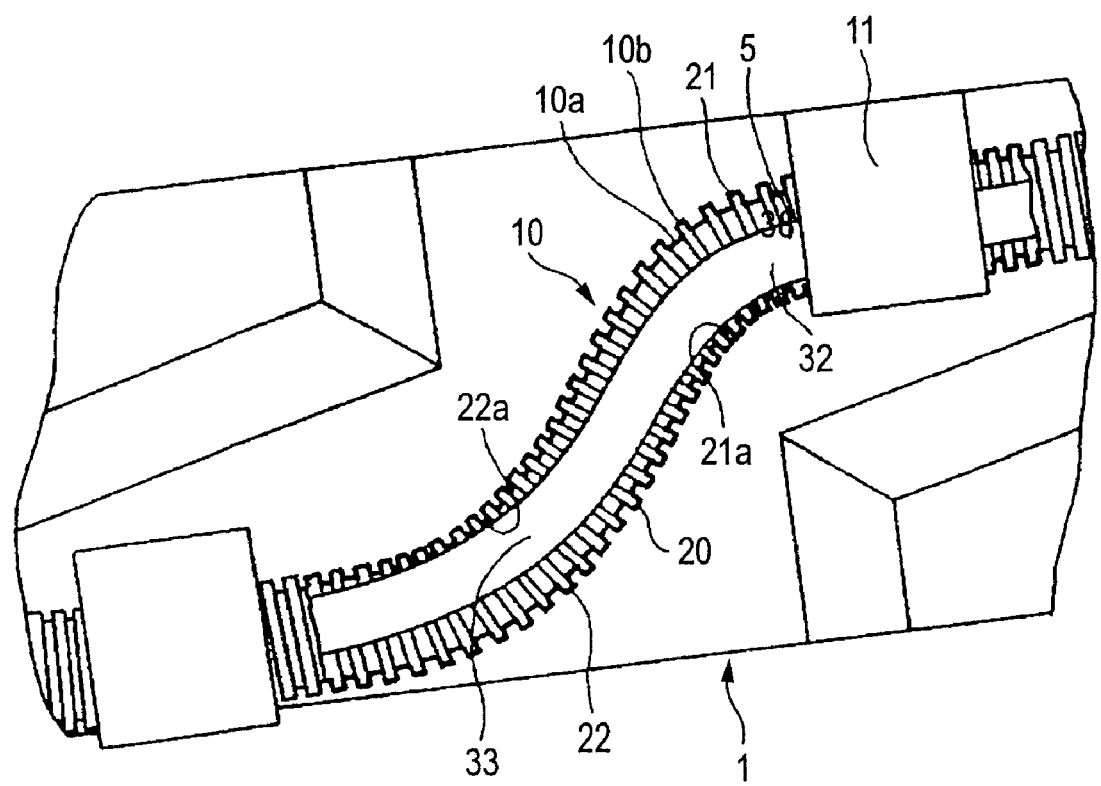
FIG. 5 is partially cross-sectional, front-elevational view showing an installed condition of the wire harness within a corrugated tube.

FIG. 5 shows the bent shape of the wire harness 5 within the corrugated tube 10 in the roof-closed condition of FIG. 2.

The wire harness 5 is bent at its portions 32 and 33 with respective radii larger respectively than those of the corresponding bent portions 21 and 22 of the corrugated tube 10, and a lower surface (bending inner-side surface) of the bent portion 32 of the wire harness 5 is contacted with a lower inner surface 21a of the front bent portion 21 of the corrugated tube 10, while an upper surface (bending inner-side surface) of the rear bent portion 33 of the wire harness 5 is contacted with an upper inner surface 22a of the rear bent portion 22 of the corrugated tube 10, and the other portion of the wire harness 5 is not held in contact with the downwardly-extending (slanting) portion 20 of the corrugated tube 10 lying between the two bent portions 21 and 22. With this arrangement, the ability of the wire harness 5 to slide within the corrugated tube 10 is enhanced, and also its lifetime is prolonged.

In accordance with the pivotal movement of the link 1, the wire harness, while maintaining this bent configuration, smoothly slides along the inner surfaces of the bent portions 21 and 22 of the corrugated tube 10 with a large radius with a low friction without producing an abnormal sound, etc.

And besides, when the minimum radius of each of the bent portions 21 and 22 of the corrugated tube 10 is secured, the minimum radius of each of the bent portions 32 and 33 of the wire harness 5 can be secured, and even if the wire harness 5 within the corrugated tube 10 can not be viewed at all with the eyes, the minimum radius of bending (which is a limit radius, and if the wire harness is bent into a radius smaller than this limit value, the durability is lowered) of each bent portion of the wire harness 5 can be automatically set by properly setting the radius of bending of each bent portion of the corrugated tube 10. These advantageous effects are attributable to the fact that the corrugated tube 10 is higher in bendability than the wire harness 5.

Figure 6:
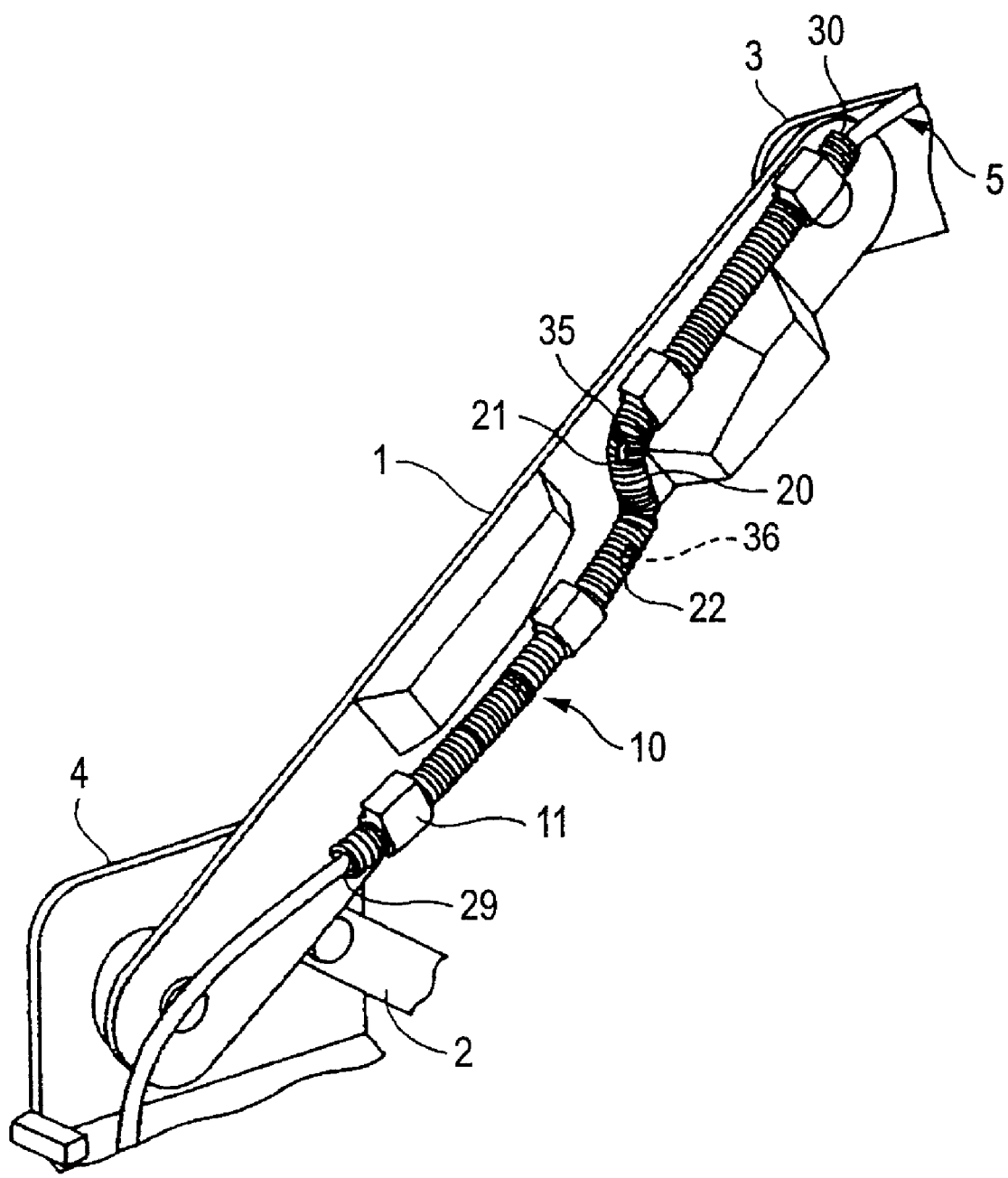
FIG. 6 is a perspective view of an important portion of another embodiment of an installation structure of (installing a wire harness on a link) of the invention, showing an initial position of the link.
Figure 7:
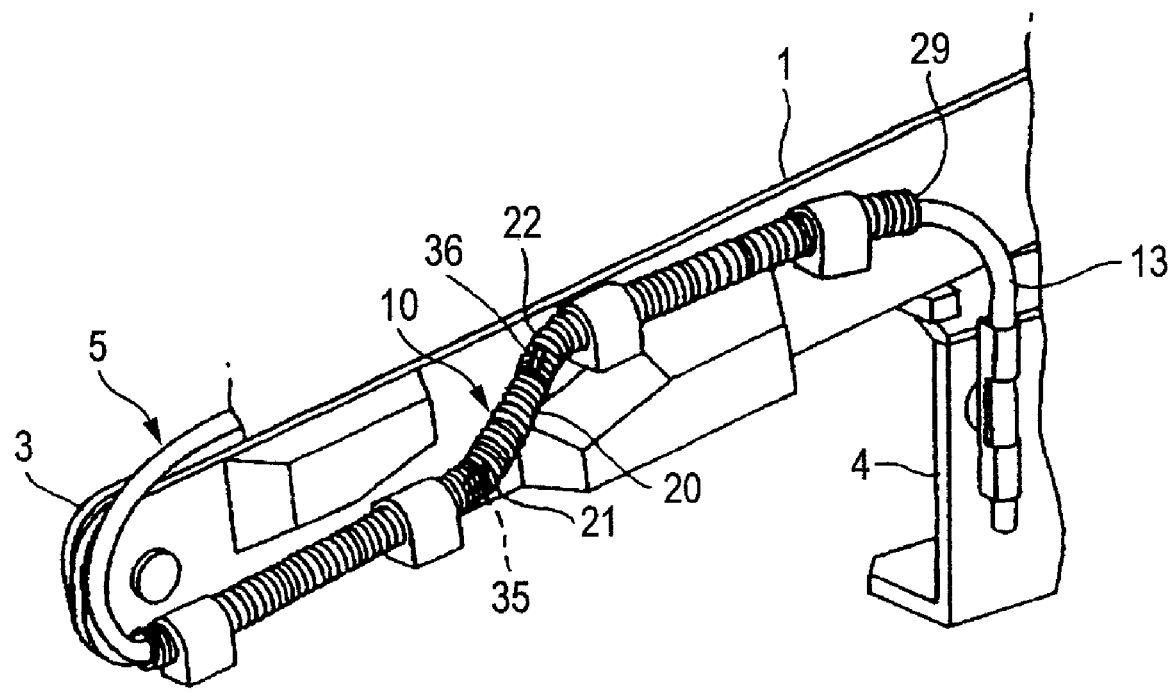
FIG. 7 is a perspective view of the wire harness installation structure of FIG. 6, showing a pivotally-moved position of the link.

FIGS. 6 and 7 show another embodiment of the invention in which in order to deal with a situation in which water intrudes along the wire harness 5 in the wire harness installation structure of FIGS. 1 to 5, holes 35 and 36 for drainage purposes are formed respectively through bending outer-side walls of two bent portions 21 and 22 of a corrugated tube 10. FIG. 6 corresponds to FIG. 1 (a roof-closed condition), and FIG. 7 corresponds to FIG. 3 (a roof-stored condition).

When the roof is closed, a main link 1 is positioned forwardly obliquely upwardly as shown in FIG. 6, and the corrugated tube 10 is bent into a generally crank-shape along the main link 1, and the drain holes 35 and 36 are formed respectively in the bending outer-side surface (upper surface) of the upper bent portion 21 and the bending outer-side surface (lower surface) of the lower bent portion 22.

When the link 1 is pivotally moved rearwardly as shown in FIG. 7, the wire harness 5 is inverted in the vertical direction, so that the upper bent portion 21 (in FIG. 6) having the hole 35 formed in the upper surface thereof becomes the lower bent portion 21 (in FIG. 7) having the hole 35 formed in the lower surface thereof, while the lower bent portion 22 (in FIG. 6) having the hole 36 in the lower surface thereof becomes the upper bent portion 22 (in FIG. 7) having the hole 36 formed in the upper surface thereof.

As shown in FIG. 5, the wire harness 5 is contacted with the bending inner-side surface 21a, 22a of each of the bent portions 21 and 22 of the corrugated tube 10 with the bending radius larger than the bending radius of the corrugated tube 10, and therefore the holes 35 and 36 formed respectively in the bending outer-side surfaces of the bent portions 21 and 22 of the corrugated tube 10 will not be closed (or blocked) by the wire harness 5, and good drainability and a good dirt-discharging ability can be achieved. Preferably, each of the holes 35 and 36 has an inner diameter, for example, generally twice larger than the pitch of ridge portions 10b of the corrugated tube 10. The holes 35 and 36 are not limited to a circular shape, but can be formed into any other suitable shape such as a generally oval shape elongated in the bending direction and a rectangular shape.

When the roof is closed as shown in FIG. 6, water drops, intruding into the corrugated tube 10 from an upper open end 30 thereof, and dirt and the like deposited on the wire harness 5 as a result of sliding movement of the corrugated tube 10 and the wire harness 5 relative to each other are discharged to the exterior via the hole 36 in the lower surface of the lower second bent portion 22 formed at the longitudinally-intermediate portion of the corrugated tube 10. The reason is that the water drops and dirt vigorously drop toward the hole 36 along the inner surface of an abruptly-slanting portion 20 lying between the first and second bent portions 21 and 22.

Therefore, the water drops are positively prevented from intruding toward the link bracket 4 (and hence into the vehicle body) along the wire harness 5. And besides, since dirt and the like will not deposit on (adhere to) the inner surface of the corrugated tube 10 during the sliding movement of the wire harness, the sliding movement of the wire harness 5 along the corrugated tube 10 is effected smoothly and positively for a long period of time.

When the roof is stored as shown in FIG. 7, water drops, intruding into the corrugated tube 10 from the upper open end 29 thereof, and dirt and the like deposited during the sliding movement are discharged to the exterior via the hole 35 in the lower surface of the first bent portion 21 formed at the longitudinally-intermediate portion of the corrugated tube 10. The corrugated tube 10 of FIG. 7 is gently slanting though not so abruptly as in FIG. 6, and therefore the water drops and dirt vigorously drop toward the hole 35 along the inner surface of the abruptly-slanting portion 20 lying between the two bent portions 21 and 22.

Therefore, the water drops are positively prevented from depositing on the rear half portion of the corrugated tube 10 (that is, deposited water drops are prevented from moving along the link bracket (4)-side wire harness portion 13 when the roof is closed as shown in FIG. 6). And besides, since dirt and the like will not deposit on (adhere to) the inner surface of the corrugated tube 10 during the sliding movement of the wire harness 5, the sliding movement of the wire harness 5 along the corrugated tube 10 is effected smoothly and positively for a long period of time.

Figure 8:
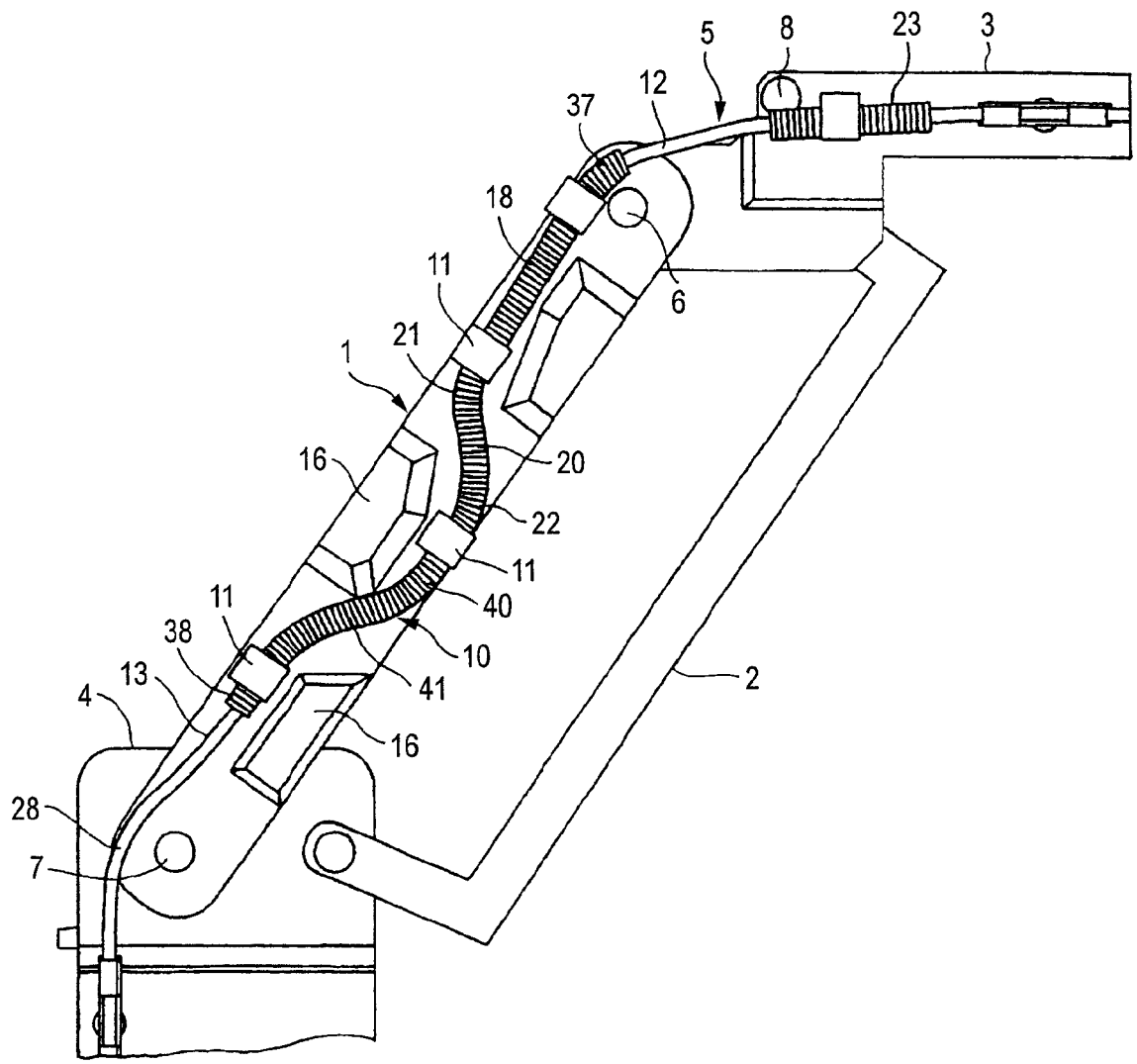
FIG. 8 is a front-elevational view of a further embodiment of an installation structure (of installing a wire harness on a link) of the invention in which the wire harness is bent into a shape different from that of the above embodiments, showing an initial position of the link.
Figure 9:
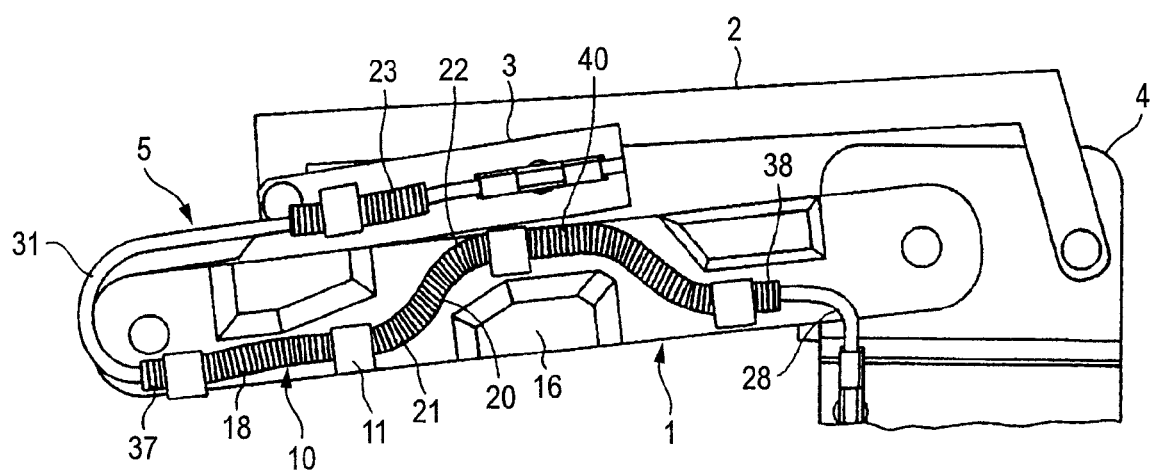
FIG. 9 is a front-elevational view of the wire harness installation structure of FIG. 8, showing a pivotally-moved position of the link.
Figure 10:
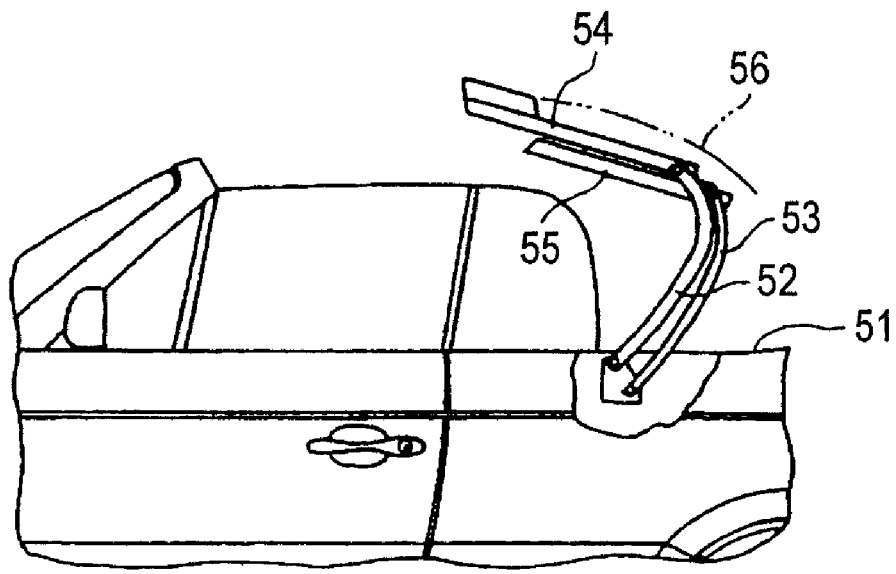
FIG. 10 is a front-elevational view of a conventional roof opening-closing structure using a link, showing a half-open condition of a roof.
Figure 11:
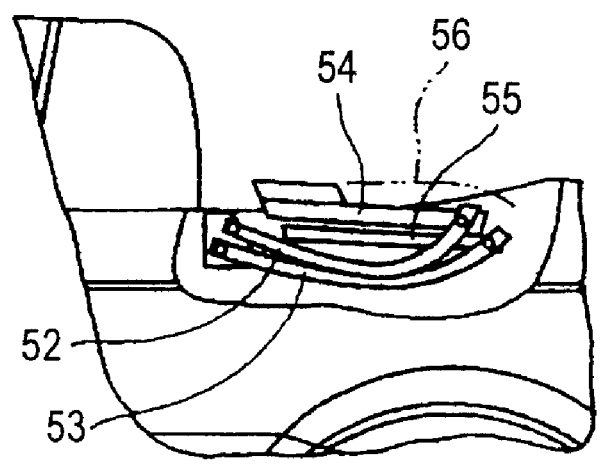
FIG. 11 is a front-elevational view of the structure of FIG. 10, showing a stored condition of the roof.

FIGS. 8 and 9 show a further embodiment of a wire harness installation structure of the invention, in which a wire harness is installed not in a generally crank-shape but in a generally U-shape (generally flattened mountain-shape) along a link. This embodiment is similar to the embodiment of FIGS. 1 to 4 except the form of installation of the wire harness 5, and therefore similar constituent portions will be designated by identical reference numerals, respectively, and detailed explanation thereof will be omitted.

FIG. 8 shows a closed condition of a roof in which two (upper and lower) links 1 and 2 are pivotally moved forwardly toward the front of a vehicle to be disposed upwardly obliquely, and FIG. 9 shows an open condition of the roof (the condition in which the roof is stored or stowed in a luggage space) in which the links 1 and 2 are pivotally moved rearwardly toward the rear of the vehicle to be disposed in a slightly downwardly-slanting position relative to a horizontal direction.

As shown in FIG. 8, one projected portion 16 is formed on an upper side portion of the link 1, and two projected portions 16 are formed on a lower side portion of the link 1, and the wire harness 5 covered with a corrugated tube 10 is installed in the generally flattened mounting-shape in such a manner that it extends through a gap between any two adjacent projected portions 16. A front half portion 18 of the corrugated tube 10 is fixed to the upper side portion of the link 1 by two clamps 11, and a generally U-shaped bent portion (intermediate portion) 40 of the corrugated tube 10 is fixed to the lower side portion of the link 1 by one clamp 11, and a rear end portion 38 of the corrugated tube 10 is fixed to the upper side portion of the link 1 by one clamp 11.

The front half portion 18 of the wire harness 5 is continuous with the intermediate portion 40 via a downwardly-slanting portion 20, and the intermediate portion 40 is continuous with the rear end portion 38 via an upwardly-slanting portion 41. The wire harness 5, passing through a bore of the corrugated tube 10, is smoothly bent at two (upper and lower) bent portions 21 and 22 of the front slanting portion 20 and also at two (upper and lower) bent portions of the rear slanting portion 41, and the radii of bending of these bent portions of the wire harness 5 are larger respectively than the radii of bending of the corresponding bent portions of the corrugated tube 10.

In the case where drain holes are formed in the corrugated tube 10, it is preferred that these drain holes be formed respectively in bending outer-side surfaces of the upper and lower bent portions 21 and 22 of the upper slanting portion 20. The reason is that the front half portion 18, the slanting portion 20 and the intermediate portion 40 of the corrugated tube 10 are bent into a generally crank-shape as a whole as is the case with the example of FIG. 2.

When the link 1 is pivotally moved as shown in FIG. 9, the link 1 is inverted, so that the generally U-shaped bent portion 40 of the wire harness 5 (in FIG. 8) assumes an mountain-like shape (generally inverted U-shape) as shown in FIG. 9, and the front half portion 18 at the upper side portion of the link 1 (in FIG. 8) becomes a rear half portion at the lower side portion of the link 1, and the lower end portion 38 at the upper side portion of the link 1 becomes a front end portion at the lower side portion of the link 1. The drain hole is disposed in the lower surface of the bent portion 21 (through which water is discharged) at the front end of the rear half portion 18, and the other drain hole is disposed in the bent portion 22 at the upper end of the slanting portion 20.

When the link 1 is pivotally moved as shown in FIG. 9, a smoothly-curved bent portion (surplus length portion) 28 (in FIG. 8) led out of the rear end portion 38 of the corrugated tube 10 along a link bracket 4, while bent with a small radius (this bent portion is designated by reference numeral 28), slides (moves) rearwardly within the corrugated tube 10, and a wire harness portion 31 extending from the rear end 37 of the corrugated tube 10 (in FIG. 9) is smoothly turned back forwardly into a generally U-shape or J-shape, so that a surplus length is absorbed. When the link 1 is pivotally moved from the condition of FIG. 9 to the condition of FIG. 8, an operation reverse to the above operation is effected, so that the surplus length portion of the wire harness 5 is smoothly moved, thereby absorbing a surplus length. These operations are similar to those of the above embodiments.

In the above embodiments, although the wire harness 5 is installed on the link 1 of the automotive roof opening-closing mechanism, the above wire harness installation structure of each embodiment can be applied to any other suitable movable structural body than the roof, such for example as a link-type door (not shown). In this case, the links 1 and 2 and the wire harness 5 are disposed horizontally, and the wire harness 5 is installed on the vehicle body, and then extends along the link 1, and then is installed on the door. The fixing link 3 is mounted on the door, and is disposed horizontally, and the link bracket 4 is mounted on the vehicle body, and is disposed horizontally. In accordance with the pivotal movement of the link 1, the wire harness 5 slides within the corrugated tube 10, so that the surplus length portions 28 and 31 are moved as described above for the roof. The roof and the door are generically called a movable structural body, and the vehicle body is generically called a fixed structural body. In the case where the wire harness 5 is installed horizontally, it is not necessary to provide the drain holes 35 and 36.

In the above embodiments, although the wire harness 5 is bent into the generally crank-shape along the link 1, the wire harness 5 and the corrugated tube 10 can be installed straight in the case where the projected portions 16 are not formed on the link 1. In this case, also, in accordance with the pivotal movement of the link 1, the wire harness 5 slides within the corrugated tube, so that the surplus length portions 28 and 31 move as described for the above embodiments. In this case, although the provision of drain holes 35 and 36 is less effective as compared with the above embodiments in which the abruptly-slanting portion 20 lies between the two bent portions, it is preferred that two drain holes be formed in a symmetrical manner respectively in upper and lower surfaces of the intermediate portion of the corrugated tube 10.

In the above embodiments, although the auxiliary link 2 is provided in parallel relation to the main link 1, there can be provided a construction in which the provision of the auxiliary link 2 is omitted, and the mechanism for opening and closing the roof, the door or the like is formed, using only the main link 1.

In the above embodiments, although the short corrugated tube 23 is mounted on the roof-side fixing link 3, a similar short corrugated tube can be mounted also on the vehicle body-side link bracket 4. The corrugated tube 23 can be suitably set to a necessary length.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-221006 filed on Aug. 14, 2007, the contents of which are incorporated herein for reference.

What is claimed is:

1. An installing structure of a wire harness, comprising:
a link which pivotally connects a fixing link at a side of a movable structural body to a link bracket at a side of a fixed structural body;
a singular first flexible protective tube through which the wire harness is slidably disposed;
a first fixing member which fixes the first flexible protective tube to the link;
a second fixing member which fixes the wire harness derived from one end of the first flexible protective tube to the fixing link; and
a third fixing member which fixes the wire harness derived from the other end of the first flexible protective tube to the link bracket,
wherein the wire harness is arranged along the fixing link, the link and the link bracket so as to extend from the movable structural body to the fixed structural body;
wherein a first wire harness portion extending from a position at the one end of the first flexible protective tube to a position at the second fixing member and a second wire harness portion extending from a position at the other end of the first flexible protective tube to a position at the third fixing member are exposed from the first flexible protective tube and are deformable;
wherein when the fixing link and the link pivot to an extension state from a folded state in accordance with a pivotal movement of the link, a surplus length portion of the wire harness moves in the singular first flexible protective tube so that the first wire harness portion becomes shorter and the second wire harness portion becomes longer and when the fixing link and the link pivot to the folded state to the extension state in accordance with the pivotal movement of the link, the surplus length portion of the wire harness moves in the singular first flexible protective tube so that the first wire harness portion becomes longer and the second wire harness portion becomes shorter;
wherein a length of the link is longer than a width of the link; and
wherein the singular first flexible protective tube is fixed to the link so as to extend along the length of the link.

2. The installing structure according to claim 1, further comprising a fourth fixing member which fixes the first flexible protective tube to the link; and
wherein opposite end portions of the first flexible protective tube project from the first and fourth fixing members.

3. The installing structure according to claim 1, wherein a part of the wire harness which extends from the first flexible protective tube is passed through a second flexible protective tube disposed at the movable structural body.

4. The installing structure according to claim 1, wherein the first flexible protective tube has a first bent portion formed at an intermediate part of the first flexible protective tube in a longitudinal direction thereof; and
wherein the wire harness is bent along a bending inner-side surface of the bent portion with a bending radius larger than that of the bent portion.

5. The installing structure according to claim 4, wherein the first flexible protective tube further comprises a second bent portion which is formed at the intermediate part of the first flexible protective tube and bent in an opposite direction from a direction that the first bent portion is bent; and
wherein drain holes are formed respectively in bending outer-side surfaces of the first and second bent portions.

6. The installing structure according to claim 1, wherein the first flexible protective tube is a corrugated tube made of a synthetic resin.

7. The installing structure according to claim 1, wherein one end of the link is pivotally connected to the fixing and the other end of the link is pivotally connected to the link bracket.

8. The installing structure according to claim 1, wherein the singular first flexible protective tube extends over a majority of the length of the link.

9. The installing structure according to claim 1,
wherein the installing structure has a first state in which the link is provided at a specified angle relative to the fixing link,
wherein the installing structure has a second state in which the link is provided at a greater angle than the specified angle relative to the movable structural body,
wherein the link has a pivot that pivotally connects the link to the movable structural body,
wherein the first flexible protective tube has a front open end and a rear open end through which the wire harness enters and exits, and the rear open end is provided closer to the pivot which connects the link to the movable structural body than the front open end, and
wherein the wire harness slides inside the first flexible protective tube in a direction from the rear open end to the front open end when the installing structure changes from the first state to the second state.

10. The installing structure of claim 9, wherein the wire harness slides inside the first flexible protective tube in a direction from the front open end to the rear open end when the installing structure changes from the second state to the first state.

11. The installing structure of claim 2, wherein the opposite end portions of the first flexible protective tube are able to bend in order to smoothly bend the wire harness.

12. The installing structure according to claim 1, wherein the link is pivotable with respect to the fixed structural body about a first axis of rotation, and the link is pivotable with respect to the movable structure about a second axis of rotation which is parallel to the first axis of rotation,
wherein the singular first flexible protective tube is bent at a first bent portion and a second bent portion, and
wherein, if the link is pivotally moved to a predetermined position, the wire harness is bent within the singular first flexible protective tube at the first bent portion and the second bent portion and the wire harness contacts the singular first flexible protective tube at the first bent portion and the second bent portion.

13. The installing structure according to claim 12, wherein drain holes are formed respectively in outer surfaces of the first and second bent portions of the singular first flexible protective tube, and
wherein the drain holes are formed so that if the wire harness contacts the singular first flexible protective tube at the first bent portion and the second bent portion, the drain holes are not blocked.

14. The installing structure according to claim 3, wherein the second flexible protective tube is shorter than the first flexible protective tube.

* * * * *